(12) United States Patent
Pettersson

(10) Patent No.: US 9,334,771 B2
(45) Date of Patent: *May 10, 2016

(54) FILTER UNIT IN A FILTER HOUSING

(71) Applicant: Scania CV AB, Södertälje (SE)

(72) Inventor: Emil Pettersson, Trosa (SE)

(73) Assignee: SCANIA CV AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,287

(22) Filed: Mar. 23, 2015

(65) Prior Publication Data

US 2015/0192044 A1    Jul. 9, 2015

Related U.S. Application Data

(62) Division of application No. 14/380,973, filed as application No. PCT/SE2013/050163 on Feb. 25, 2013.

(30) Foreign Application Priority Data

Mar. 1, 2012    (SE) ........................................ 1250194

(51) Int. Cl.
| | | |
|---|---|---|
| *F01N 3/021* | (2006.01) | |
| *B01D 46/00* | (2006.01) | |
| *B01D 46/10* | (2006.01) | |
| *F02M 35/16* | (2006.01) | |
| *F02M 35/04* | (2006.01) | |
| *F02M 35/02* | (2006.01) | |

(52) U.S. Cl.
CPC ............ *F01N 3/021* (2013.01); *B01D 46/0004* (2013.01); *B01D 46/0047* (2013.01); *B01D 46/103* (2013.01); *F02M 35/0204* (2013.01); *F02M 35/042* (2013.01); *F02M 35/164* (2013.01); *B01D 2271/022* (2013.01)

(58) Field of Classification Search
CPC ............ B01D 46/0004; B01D 46/103; B01D 2271/022; F02M 35/0204; F02M 35/042; F02M 35/164
See application file for complete search history.

(56) References Cited

U.S. PATENT DOCUMENTS

| 1,940,316 | A |   | 12/1933 | McKinley .................... 210/437 |
|---|---|---|---|---|
| 3,849,093 | A |   | 11/1974 | Konishi et al. ................. 55/316 |
| 5,114,572 | A | * | 5/1992 | Hunter et al. ................. 210/120 |
| 5,472,463 | A |   | 12/1995 | Herman et al. ................ 55/319 |
| 5,512,086 | A |   | 4/1996 | Glucksman ...................... 96/68 |
| 6,179,890 | B1 | * | 1/2001 | Ramos et al. .................. 55/482 |
| D437,401 | S |   | 2/2001 | Ramos et al. ................ D23/364 |

(Continued)

FOREIGN PATENT DOCUMENTS

| EP | 1 577 534 A2 | 9/2005 |
|---|---|---|
| EP | 2 050 950 A2 | 4/2009 |

(Continued)

*Primary Examiner* — Amber R Orlando
*Assistant Examiner* — Britanny Precht
(74) *Attorney, Agent, or Firm* — Ostrolenk Faber LLP

(57) ABSTRACT

A filter unit (50) in a filter housing (10). The filter unit has a substantially semicylindrical air filter (52). The filter housing has an air inlet (20) and an engine air outlet (40). The filter housing has an extra air outlet (36) and an air aperture (64) to the extra air outlet (36). The air aperture extends between the filter unit (50) and the engine air outlet (40). The aperture (64) extends along a periphery of the engine air outlet.

2 Claims, 4 Drawing Sheets

(56) References Cited

U.S. PATENT DOCUMENTS

| | | | |
|---|---|---|---|
| 6,391,197 B1 * | 5/2002 | Billiet | 210/232 |
| 6,416,563 B1 * | 7/2002 | Wright et al. | 55/513 |
| 6,440,201 B1 * | 8/2002 | Billiet | 96/147 |
| 6,517,598 B2 | 2/2003 | Anderson et al. | 55/498 |
| 6,814,772 B1 | 11/2004 | Wake et al. | 55/385.3 |
| D520,619 S | 5/2006 | Kuempel et al. | D23/364 |
| 7,086,390 B2 | 8/2006 | Shears et al. | 123/518 |
| 7,465,329 B2 | 12/2008 | Oshima | 55/385.3 |
| 7,866,600 B2 | 1/2011 | Barnard et al. | 244/53 B |
| 7,905,936 B2 | 3/2011 | Coulonvaux et al. | 55/357 |
| 8,496,723 B2 | 7/2013 | Reichter et al. | 55/503 |
| D705,412 S | 5/2014 | Dworatzek et al. | D23/365 |
| 2002/0189216 A1 * | 12/2002 | Wright et al. | 55/513 |
| 2004/0065602 A1 * | 4/2004 | Moscaritolo et al. | 210/130 |
| 2007/0175194 A1 * | 8/2007 | Nepsund et al. | 55/498 |
| 2007/0261374 A1 * | 11/2007 | Nelson et al. | 55/434 |
| 2010/0313533 A1 | 12/2010 | Muenkel | 55/484 |
| 2013/0340231 A1 | 12/2013 | Lu | 29/428 |

FOREIGN PATENT DOCUMENTS

| | | |
|---|---|---|
| EP | 2 169 209 A1 | 3/2010 |
| JP | 7-166985 | 6/1995 |

* cited by examiner

FILTER UNIT IN A FILTER HOUSING

CROSS-REFERENCE TO RELATED APPLICATIONS

This application is a divisional of U.S. patent application Ser. No. 14/380,973, filed Aug. 26, 2014, incorporated herein by reference, which is a 35 U.S.C. §§371 National Phase conversion of PCT/SE2013/050163, filed Feb. 25, 2013, which claims priority of Swedish Patent Application No. 1250194-6, filed Mar. 1, 2012, the contents of which are incorporated by reference herein. The PCT International Application was published in the English language.

TECHNICAL FIELD

The invention relates to a filter unit disposed in a filter housing. The filter unit comprises an air filter with a filter top and a filter bottom. The invention relates also to a filter housing for such a filter unit.

BACKGROUND

Known air filter arrangements for a combustion engine of a truck often have an extra air outlet connected to an air compressor for various compressed air consumers on board the vehicle. The hose from the extra air outlet to the compressor is at present usually fitted to a pipe stub on one or more ducts in a blow-moulded air duct system which leads the air from the engine air outlet to the engine.

The configuration of the blow-moulded air duct system is thus complicated and the air flow through the air duct is adversely affected such that the pressure drop increases across the system, leading to higher fuel consumption of the engine. When the compressor draws air in, it takes part of the air which is on its way on into the engine, thereby also disrupting the measurement of the mass flow to the engine.

SUMMARY OF THE INVENTION

An object of the invention is to propose a filter housing with an extra air outlet which minimises adverse effects upon the air flow to the engine.

In one aspect of the invention, the filter housing therefore has an extra air outlet and also an air aperture to the extra air outlet. The air aperture is situated between the filter unit and the engine air outlet, and the air aperture extends along a periphery of the engine air outlet.

This means that the filtered air to the extra air outlet can be extracted already in the filter housing before the connection to the engine's air ducts, with the result that the filtered main flow can proceed undisturbed through these ducts, since the extra air outlet may then be situated on the filter housing. The result is less or no disturbance to the mass flow meter, which will thus be easier to place on the air duct. Only one run of compressor hose is needed instead of a run for each air duct.

In one embodiment of the invention, the air aperture is delineated between a cover of the filter housing and an upper side of the filter unit. The existing interface between the cover and the filter unit may thus easily and effectively be opened to form the air aperture.

The air aperture may then comprise a gap running obliquely upwards and outwards. Part of the filtered air may then be distributed evenly to the extra air outlet effectively without causing disturbance.

In this embodiment the extra air outlet may further be situated on the cover of the filter housing, making it possible to use a standardised connection to take air to the compressor more directly, before the connection of the air ducts to the engine.

There may also be an encircling air duct delineated between the cover of the filter housing and the upper side of the filter unit to transfer filtered air between the air aperture and the extra air outlet.

A filter unit for a filter housing according to the invention with an air inlet and an engine air outlet comprises a substantially semicylindrical air filter with a filter top and a filter bottom. An upper side of the filter top is configured to delineate in conjunction with a cover of the filter housing an air aperture to an extra air outlet of the air filter housing, which aperture extends along a periphery of the engine air outlet. The upper side of the filter top is also configured to delineate in conjunction with the cover of the filter housing an encircling air duct for transfer of filtered air between the air aperture and the extra air outlet.

Other features and advantages of the invention may be indicated in the description of embodiment examples set out below.

DETAILED DESCRIPTION OF EMBODIMENTS

Figure 1:
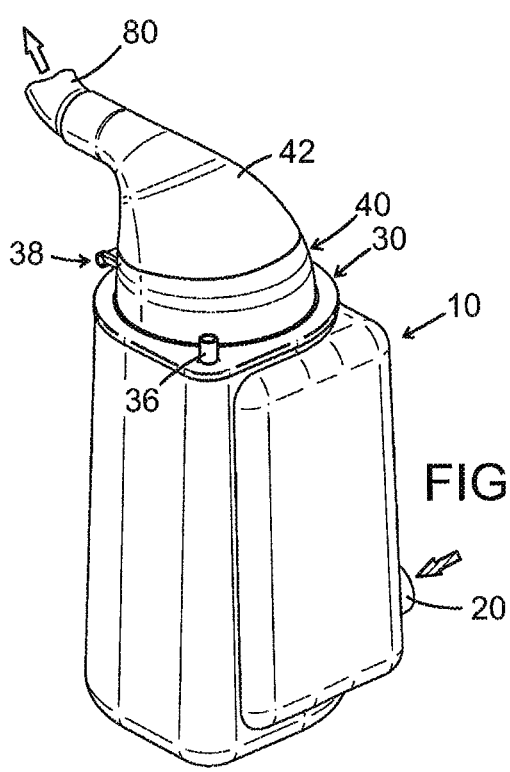
FIG. 1 is an oblique view from above of an air filter arrangement according to the invention.
Figure 2:
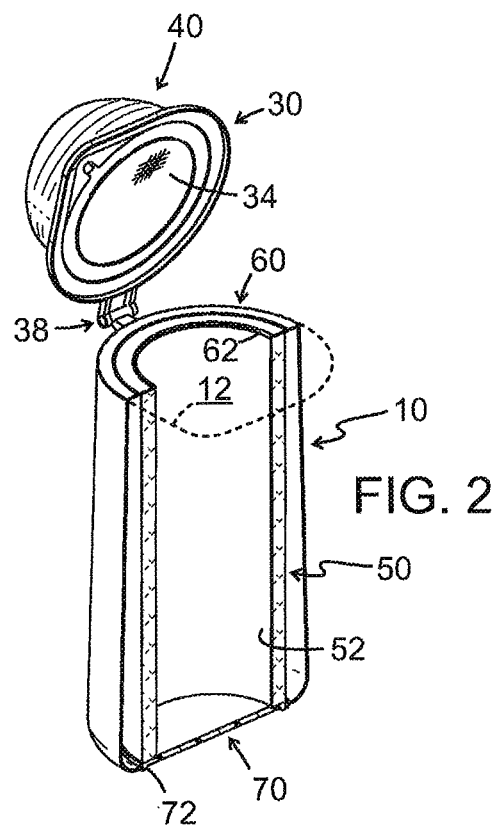
FIG. 2 is a longitudinal sectional view corresponding to FIG. 1 with cover open.

Throughout the drawings, the same reference numerals are used for items with same or similar functions.

The air filter arrangement depicted in the drawings comprises in a known way an elongate air filter housing 10 for accommodating a filter unit or cartridge 50 comprising a substantially semicylindrical air filter 52. Air which is to be filtered passes through an air inlet 20 (FIG. 1) on the outside of the housing 10 into an annular space between the filter unit 50 and the filter housing 10 and, after passing through the filter 52, proceeds through an engine air outlet 40 in a cover 30 on the upper side of the filter housing 10. This engine air outlet 40 is itself intended to be connected to an undepicted air intake of a combustion engine via successive air ducts 42, 80.

Figure 4:
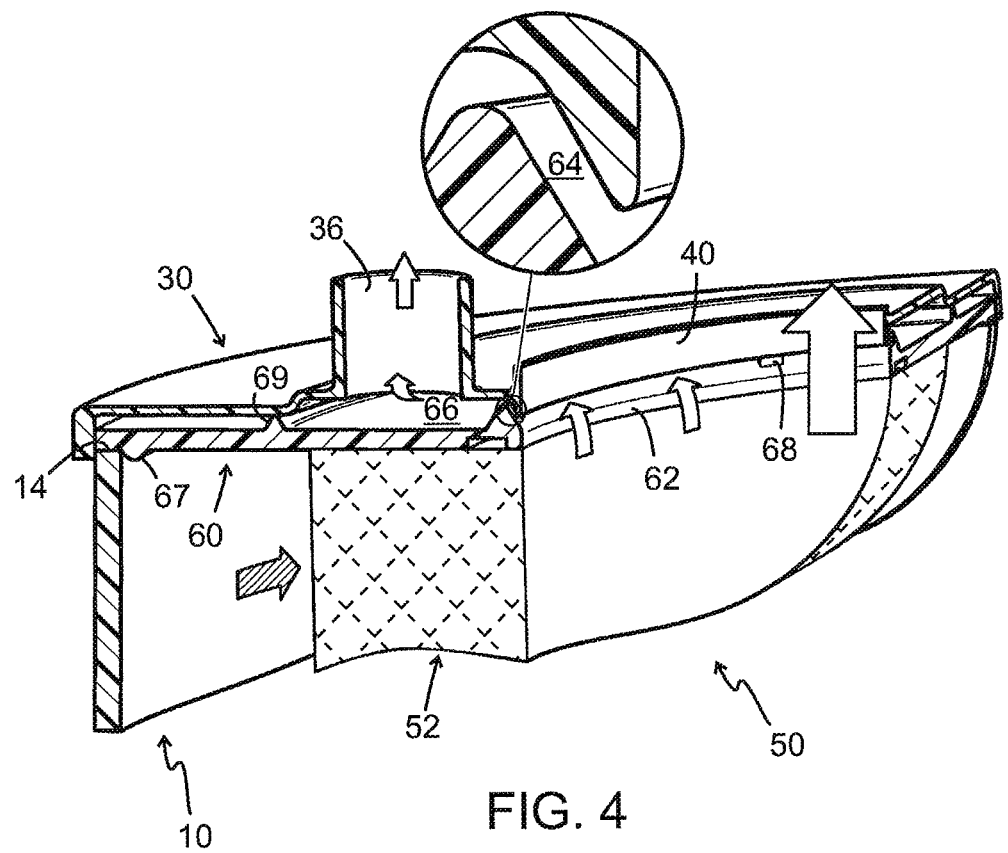
FIG. 4 is a detailed view, with portions cut away, of an upper portion of an air filter arrangement according to the invention.

As most clearly depicted in FIG. 4, the filter 52 of the filter unit 50 is connected to a filter top in the form of an upper seal element 60 which has a central aperture 62 coaxial with an inside of the filter 52 and with the air outlet 40. When the filter unit 50 is fitted in the housing, the outer periphery of the seal element 60 abuts sealingly against an edge 14 which delineates a top aperture 12 of the housing. Centering means of the housing 10 and/or the filter top 60, e.g. an encircling protrusion 67 directed downwards from the underside of the filter top 60, may facilitate and ensure that the filter top reaches a correct position at the upper side of the housing 10.

Figure 3:
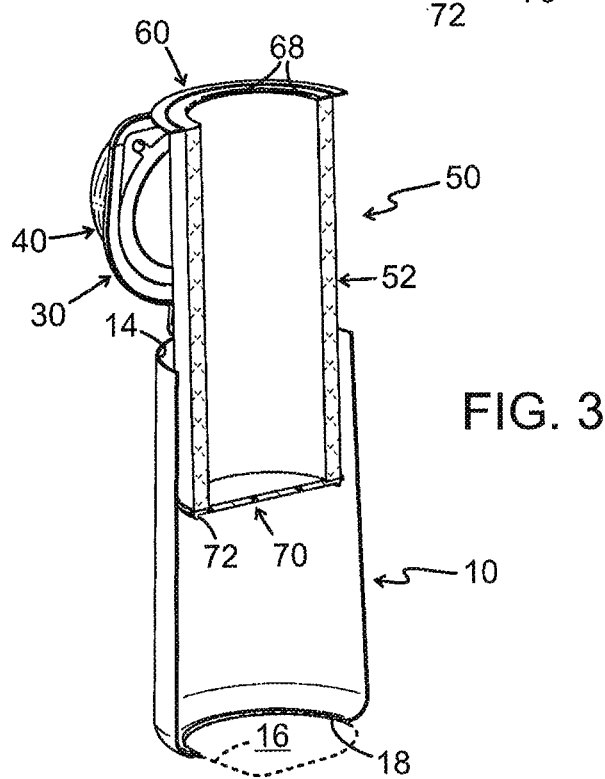
FIG. 3 is a longitudinal sectional view approximately as per FIG. 2 with air filter partly pulled out.

Between the upper seal element 60 of the filter unit 50 and the engine air outlet 40 there is an air aperture 64 (FIG. 4) to an extra air outlet 36. As indicated by the arrows in FIG. 4, part of the filtered air may then also be led to an encircling air duct 66 via the air aperture 64 between the cover 30 and the upper seal element 60 before making its way out through the extra air outlet 36. The air duct 66 may be delineated radially outwards by an encircling ridge 69 which is part of the upper seal element 60 and which abuts sealingly against the cover 30. In the example depicted, the extra air outlet 36, which may distribute filtered air in the arrangement to an undepicted air consumer, e.g. an air compressor, is situated in the filter housing 10 cover 30. The air aperture 64 extends along a periphery of the engine air outlet 40, with advantage around the whole periphery, in the form of a gap which slopes obliquely outwards and upwards. The width of the gap may be maintained by supports, e.g. a plurality of evenly distributed bulges 68 which may, as desired, be situated on the upper seal element 60 (FIG. 3) or on the cover 30.

Figure 5:
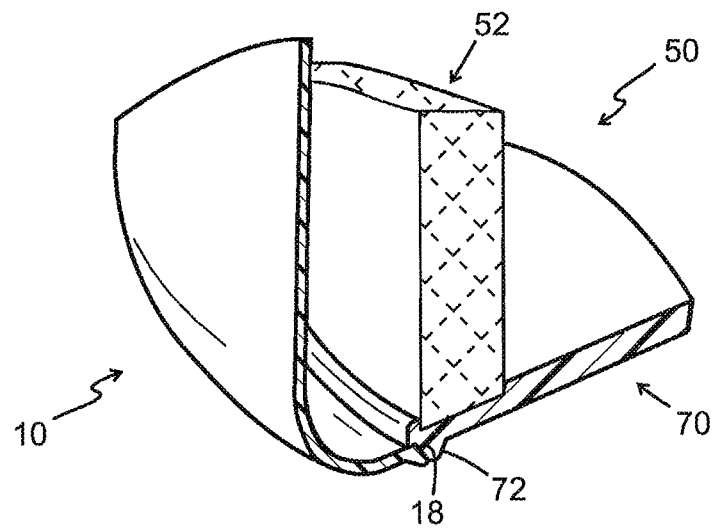
FIG. 5 is a detailed view, with portions cut away, of a lower portion of an air filter arrangement according to the invention.

As most clearly illustrated by the simplified depiction in FIG. 5, the filter 52 of the filter unit 50 is also connected to a filter bottom in the form of a lower seal element 70. When the filter unit 50 is fitted in the housing 10, the outer periphery of the lower seal element 70 abuts sealingly against a lower circumferential edge 18 which delineates a bottom aperture 16 (FIG. 3) of the housing. This bottom aperture 16 allows dirt, cleaning agents and other particles to make their way out of the filter housing 10 when it is being cleaned, e.g. on the occasion of change of the filter unit 50. Centering means of the housing 10 and/or the filter bottom 70, e.g. an encircling protrusion 72 directed downwards from the underside of the filter bottom 70, may facilitate and ensure that the filter bottom 70 also reaches a correct position at the lower side of the housing 10.

Although other solutions are possible, the aforesaid cover 30 in FIGS. 1-3 and FIGS. 6-7 is depicted as being connected pivotably to the filter housing 10 via a hinge 38 situated at an upper outside of the housing 10. The air outlet 40 of the cover 30 may further be covered by a filter element 34 (FIG. 2), e.g. a filter cloth and/or a fine-mesh grille, to prevent contaminants and solid particles from entering the air ducts 40, 80 when the cover 30 is open. The cover 30 may be fastened to the housing 10 by suitable connecting means, e.g. undepicted tightening screws or other kinds of fastenings.

Figure 6:
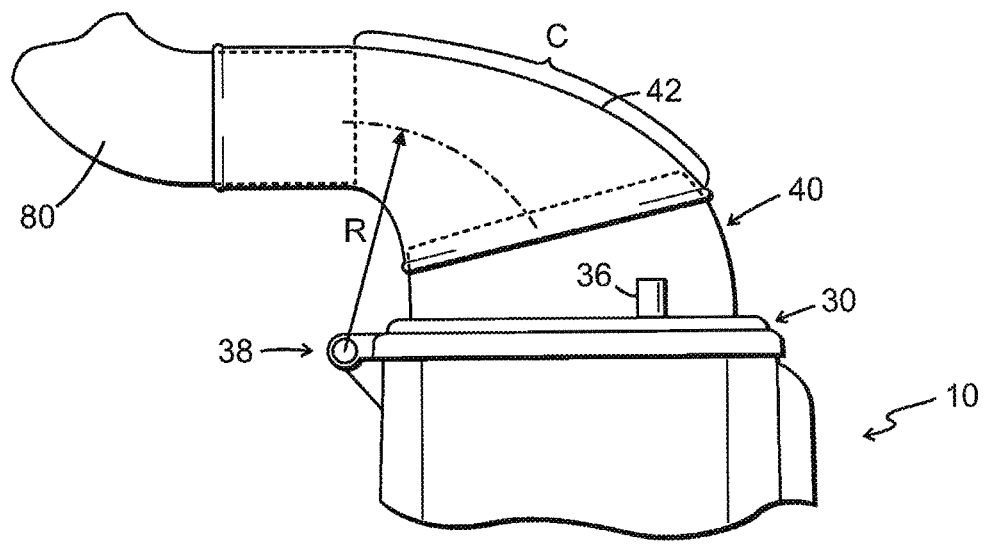
FIG. 6 is a side view, with portions cut away, of an upper portion of an air filter arrangement according to the invention with cover closed.
Figure 7:
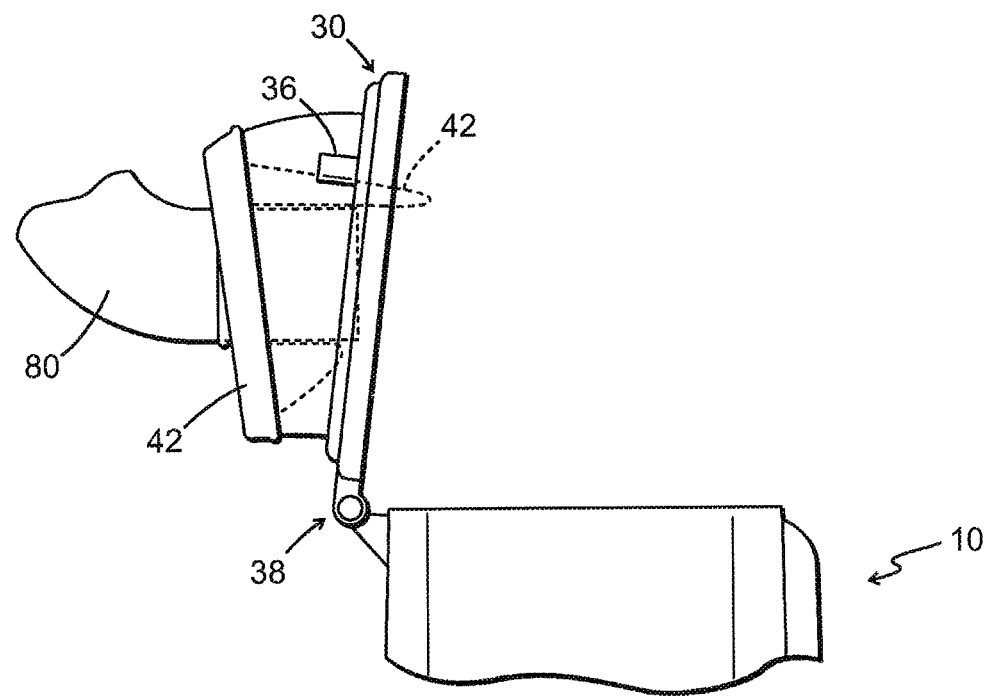
FIG. 7 is a view corresponding to FIG. 6 with cover open.

In the embodiment depicted in FIGS. 6 and 7, the air duct 40 situated nearest to the cover 30 is provided with a collapsible or flexible pipe section 42 which allows repeated opening and closing of the cover 30 without removal from or movement of the fixed air duct 80 situated nearest to the engine. In the embodiment depicted, the pipe section 42 is provided with a narrowing curved portion C made of bendable rubber elastic material which, like a roll bellows, allows the larger cross-section nearest to the cover 30 to be turned inside out, with or without help from a service technician, over the narrowing cross-section nearest to the air duct 80, approximately as depicted in FIG. 7, when the cover 30 is being opened. In a functional state, the pipe section 42 is stretched over the engine air outlet 40 and the air duct 80. A middle line of the curved portion may then extend at approximately constant distance R from the cover's hinge 38.

Figure 8A:
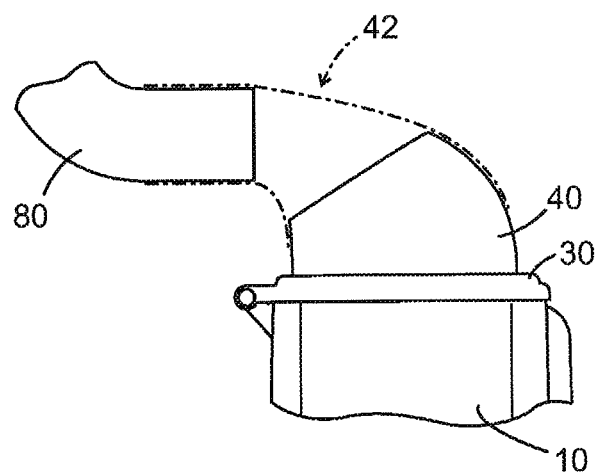
FIGS. 8A-8C depict schematically a process of opening the cover of an arrangement substantially according to FIGS. 6 and 7.
Figure 8B:
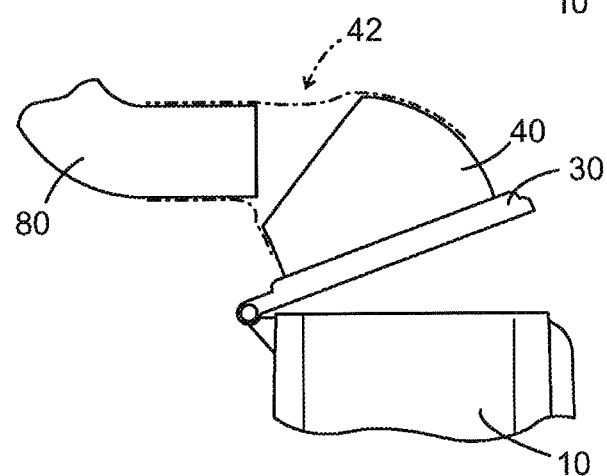
Figure 8C:
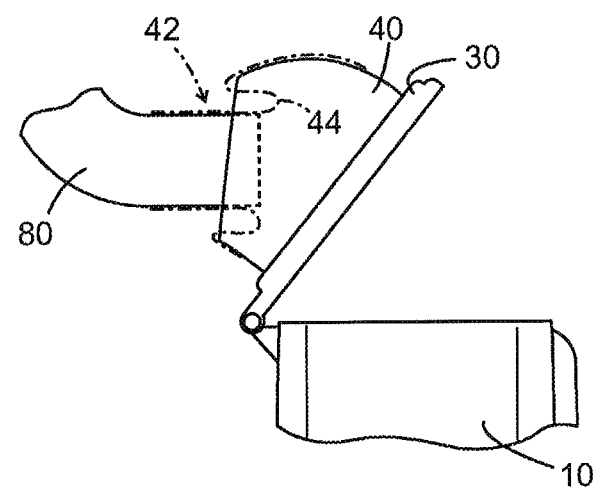

FIGS. 8A-8C depict in more detail an opening process of an arrangement substantially corresponding to that in FIGS. 6 and 7. The air ducts 40 and 80 extend relatively far into the flexible pipe section 42 in order to support it and prevent its collapsing during operation. As indicated in FIG. 8B, the cross-section of the pipe section 42 between the ducts may in various ways, e.g. by material notches or built-in stresses, be arranged to be drawn together somewhat or deformed radially inwards when the cover 30 starts opening. The larger duct 40 connected to the cover 30 will then be situated round and spaced from the narrower duct 80. When thereafter the cover in FIG. 8C approaches the open state which allows an undepicted filter unit to be taken out of the filter housing 10, a roll lobe 44 may naturally form on the portion of the pipe section 42 which is supported on an end portion of the narrower duct 80 so that the pipe section 42 unrolls like a roll bellows on this end portion.

In this and other embodiments, the cover 30 need not necessarily be connected pivotably to the remainder of the housing 10, as it may also in an undepicted way be capable of being completely lifted away from the housing 10.

The detailed description set out above is primarily intended to facilitate understanding and no unnecessary limitations of the invention are to be construed therefrom. The modifications which will be obvious to one skilled in the art from perusing the description may be effected without departing from the concept of the invention or the scope of the claims set out below.

The invention claimed is:

1. A filter unit disposed in a filter housing, the filter housing comprising an air inlet for air to the filter, a cover of the filter housing, an extra air outlet from the filter housing, and an engine air outlet for filtered air from the filter housing;

the filter unit comprising a substantially semi-cylindrical air filter with a filter top and a filter bottom;

wherein:

an upper side of the filter top is configured to delineate in conjunction with the cover of the filter housing an air aperture communicating air from the air aperture to the extra air outlet of the filter housing; the air aperture extending along a periphery of the engine air outlet, an inlet of the engine air outlet through which air is introduced from the filter top to the engine air outlet has a central longitudinal axis which is parallel to a central longitudinal axis of the filter unit, a portion of the cover of the filter housing extends perpendicularly to the central longitudinal axis of the filter unit, and all of the air aperture is located between the portion of the cover of the filter housing, which extends perpendicularly to the central longitudinal axis of the filter unit, and the filter top of the filter unit.

2. A filter unit according to claim 1, in which the upper side of the filter top is also configured to delineate in conjunction with the cover of the filter housing an encircling air duct to transfer filtered air between the air aperture and the extra air outlet.

* * * * *